INVENTOR.
MILTON R. ADAMS
JOSEPH L. PECZKOWSKI
FRANK J. JANDRASI
BY William S Thompson
AGENT 3,070,073
ISOCHRONOUS GOVERNOR
Milton R. Adams, Joseph L. Peczkowski, and Frank J. Jandrasi, South Bend, Ind., assignors to The Bendix Corporation, South Bend, Ind., a corporation of Delaware
Filed Dec. 29, 1960, Ser. No. 79,431
10 Claims. (Cl. 121—42)

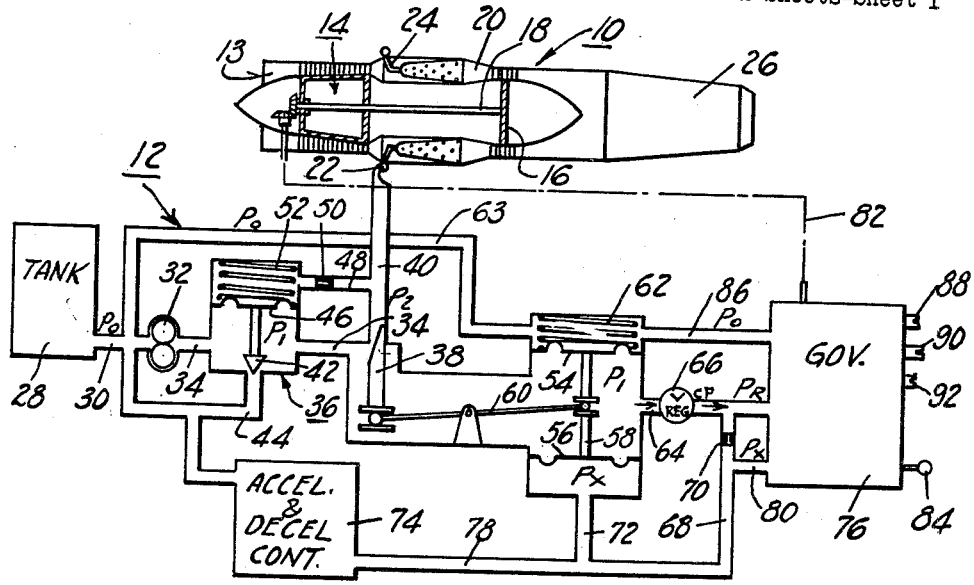

The present invention is directed to governor apparatus and more particularly to governor apparatus for controlling the governed operating speed of an engine and which is readily adjustable, preferably externally, to provide either proportional or isochronous governing operation.

Proportional or "droop" type governors and isochronous type governors each have separate characteristics which makes one type more suitable as a control in one situation than another. For example, proportional governors generally have rapid response and good stability, however, they permit a speed shift of a certain amount with variations in engine load. Isochronous governors on the other hand maintain nearly a constant engine speed for all load variations, but are generally inferior in response rate and stability as evidenced by hunting, overshooting, or excessive time required to stabilize. It is desirable therefore to match the type of governor operation to select the most suitable for a given load. Further, it is often desirable to alternate the type of governor operation for a given load. For example, in electrical power generation systems having multiple power plants connected to a common load it is desirable to have one isochronous control unit to allow for load fluctuations. It is further desirable to alternate from time to time the unit being driven isochronously since it is subject to greatest wear.

Consequently, it is an object of the present invention to provide a governor apparatus which may be readily adjusted without dismounting or disassembling the control unit to provide either proportional or isochronous operation.

It is a further object of the present invention to provide governor apparatus having improved isochronous operation by the provision of a separate integrating piston in combination with a proportional type governor which permits the more stable proportional system to correct the major portion of any speed error whereas the integrating piston is required to correct only small errors.

It is a still further object of the present invention to provide a governor having separate proportional and integrating parts, but requiring only a single speed sensor to actuate both sections.

Other objects and advantages of the present invention will become apparent on consideration of the description read in conjunction with the appended drawings wherein:

FIGURE 1 is a schematic drawing of a system wherein our governor may be used;

FIGURE 2 is a more detailed schematic of a preferred embodiment of our governor including the novel aspects of our invention;

Figure 3:
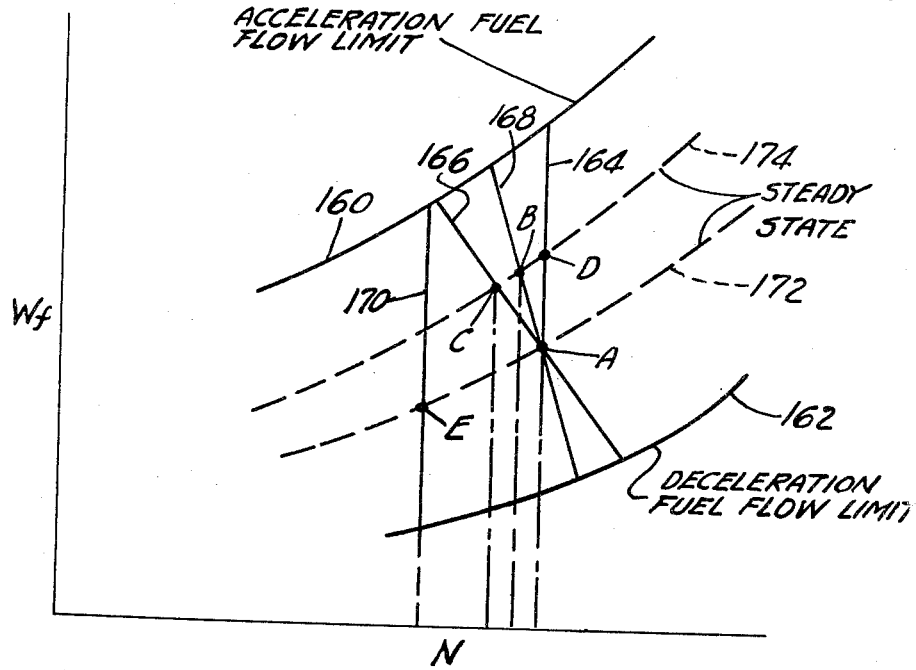
FIGURE 3 is a first curve showing some of the operating characteristics of our invention as brought out in a plot of speed vs. fuel flow in the system of FIGURE 1.

Referring to FIGURE 1 there is illustrated a system in which our governor may be used and is broadly comprised of a power plant 10 and fuel supply system 12. Power plant 10 is illustrated as a gas turbine engine having an air inlet 13, an air compressor unit 14, a turbine 16, and a drive shaft 18 enabling the turbine to drive the compressor. A series of can type combustion chambers 20 are annularly arranged about the interior of the engine intermediate the compressor and turbine and receives fuel from manifold 22 through individual fuel nozzles 24. Gas turbine 10 also includes an exhaust or tailpipe section 26.

Fuel supply section 12 has as its broad object the task of supplying a metered quantity of pressurized fuel to the manifold 22 and to thereby control the operating characteristics of the engine. To achieve this object fuel maintained in tank 28 is delivered at a relatively low pressure, designated $P_0$, to inlet conduit 30 which contains positive displacement gear pump 32 which may be driven by any convenient source, such as for example the engine 10. Pump 32 operates to raise the fuel pressure to a relatively high value, designated $P_1$, and discharge fuel into pump outlet conduit 34. Fuel in conduit 34 is transmitted past a by-pass valve generally indicated at 36 to metering valve 38 which is slidably positionable in a manner to be described to control the quantity or rate of fuel delivered to metered fuel conduit 40. Fuel in conduit 40 is at a lesser value than $P_1$ due to the throttle effect of valve 38 and is designated $P_2$ pressure fuel. Conduit 40 is connected to engine manifold 22 to supply the metered fuel thereto. By-pass valve 36 is provided to control the pressure difference across metering valve 38, ($P_1$—$P_2$), to a constant value such that the quantity of metered fuel to conduit 40 will be solely dependent on the position of said metering valve and not on fluctuations or variations in supply pressure. To achieve this end a valve member 42 is provided to control the flow of fuel from conduit 34 to conduit 44, said conduit 44 being connected to conduit 30 and thus containing relatively low pressure $P_0$ fuel. Thus depending on the position of valve member 42, varying quantities of fuel are returned to the pump inlet for recirculation. Valve member 42 is secured to a diaphragm 46 which is exposed to $P_1$ pressure fuel on the lower side from conduit 34 and $P_2$ pressure fuel on the upper side from conduit 40 by means of conduit 48 which includes a restrictive damping bleed 50, such that diaphragm 46 is responsive to and will control the operation of valve member 42 as a function of the difference in pressure between $P_1$ and $P_2$ fuel. Spring 52 is provided to provide a pre-load to diaphragm 46 which determines the magnitude of the difference between $P_1$—$P_2$ pressures.

Thus the rate of flow of metered fuel is determined solely by the axial position of metering valve 38 which in turn is positioned by positioning means comprised of the two diaphragms 54 and 56, the rod 58 connecting said diaphragms and pivoted lever 60 which is secured to rod 58 on one end and metering valve 38 on the other, such that any movement imparted to diaphragms 54 and 56 is transmitted to metering valve 38. $P_1$ pressure fuel from conduit 34 is exposed to the inner surfaces of diaphragms 54 and 56 to provide equal and oppositely acting pressure induced forces acting on rod 58 which balance or neutralize each other. A reference force generally proportional to the movement of the diaphragm and rod assembly is applied to the upper surface of diaphragm 54 by spring 62 and also the minor force produced by relatively low pressure $P_0$ fuel supplied by conduit 63 from pump inlet conduit 30. This force is generally proportional to diaphragm movement since as diaphragm 54 is moved up or down it will compress or elongate spring 62 thus varying the force said spring produces. A servo control fluid designated $P_X$ is supplied to the lower surface of diaphragm 56 by way of the circuit defined by conduit 64, which includes constant pressure regulating valve 66, conduit 68 which includes restrictive servo bleed 70, and branch conduit 72. Fuel pressure at the discharge side of valve 66 would be maintained at a relatively high constant pressure in the preferred form of our invention designated at $P_R$, but it is pointed out that the purpose for doing so is to maintain a substantially constant pressure difference between $P_R$ and $P_0$ fuel which may alternately be done by permitting $P_R$ to vary as long as it did so substantially uniformly with $P_0$. By bleeding off fuel in conduit 68 downstream of restriction 70 the $P_X$ pressure therein may be varied to any convenient value between the limits of the source pressure $P_R$ and the dump or reservoir pressure $P_0$ and thus vary the fluid pressure force acting on the lower surface of diaphragm 56 and thus the position of metering valve 38 and the rate of flow delivered to manifold 22.

To further complete the showing of a fuel supply system we have illustrated in FIGURE 1 two basic control systems comprised of unit 74 and a governor control unit 76 which may contain means for bleeding off fuel from conduit 72 through their respective connecting conduits 78 and 80. Since the aspects of the present invention are fully contained within the governing unit 76 it is pointed out that the details of the acceleration and deceleration unit 74 may be in accordance with any such unit well known in the art having the broad purpose of limiting or controlling fuel during engine acceleration and/or deceleration ranges of operation. The broad teaching of a suitable arrangement and selection of engine parameters for effecting this object may be found in U.S. Patent 2,581,275 issued to Frank C. Mock and having a common assignee with the present application.

This system described to this point is for the purpose of illustrating a fuel supply system that may be readily controlled to meter fuel to an engine by the simple expedient of bleeding off more or less fluid from a conduit such as conduits 68 and/or 72. It is to be understood that the description is intended to disclose a general class of fuel systems and the specific relation of the parts may be readily varied to suit particular requirements.

Governor unit 76 operates to bleed off more or less fuel from conduit 68 through branch conduit 80 in response to an engine speed input signal derived from mechanical connection 82 and the position of the throttle lever 84. $P_R$ pressure fuel is supplied as an operating control fluid to governor 76 by way of conduit 64 and low pressure fuel is returned to pump inlet by the connecting conduit 86. External screw head adjustments 88, 90 and 92 are provided for purposes which will later be described in detail.

Turning now to FIGURE 2 there is shown a cross sectional schematic view of our governor illustrating in detail a preferred embodiment of our invention. Portions of the fuel supply system carried over from FIGURE 1 bear the same reference numerals assigned therein. Governor 76 is comprised of a housing 94 defining a first chamber 96 and a second chamber 98. A pair of flyball governor weights 100 are arranged in chamber 96 and are pivotably secured at 102 to bracket 104 which in turn is secured to rotating connection 82 which is driven in relation to engine speed. The force produced due to centrifugal forces acting on the rotating weights 100 tends to urge the weights outwardly from their spin axis so that the extended foot projections 106 thereof are urged upwardly and bear against the enlarged portion 108 of the rod 110 with a force proportional to engine speed. Rod 110 is secured to lever 112 which is pivoted at 114 and is comprised of a first leg 116 and a second leg 118 shown in the illustrated embodiment as at substantially right angles to one another. The angular relation of legs 116 and 118 is, however, non-essential to practice the invention. A second force acting to oppose the force generated by flyweights 100 is produced by spring 120 which is confined between retainers 122 and 124, the latter being pivotally secured to housing 94 at 126. This second force is transmitted downwardly through roller 128, which may be translated by means of external adjustment 92, to lever 112 and thus oppose the force generated by the flyweights. An externally extending throttle member 84, pivoted at 130, engages retainer 122 so that the force bearing down on lever 112 is in direct response to throttle position. It will aid in understanding the present device to consider that the force produced by spring 120 is representative of desired or selected speed that the operator wishes the engine to run whereas the force produced by flyweights 100 is representative of actual engine speed, such that when the two forces are in balance the engine is running at substantially the selected speed, and when the forces are not in balance a certain departure exists between selected speed and actual speed which may be termed speed error. The speed error force acting on lever 112 will tend to rotate said lever about pivot 114; clockwise when the actual speed force is less than the desired speed force, and counterclockwise when the actual speed force is greater than the desired speed force. The second leg 118 of lever 112 includes first and second valve portions 132 and 134 respectively which may be either independent valve members or formed as part of lever 112 as illustrated in FIGURE 2. Movement of said first and second servo valve members is in direct relation to the movement of lever 112. A movable servo orifice member 136 is slidably mounted in housing 94 and is arranged in close proximity to valve portion 132 such that the relative position of said orifice member with respect to said valve defines the effective fluid flow permitting area and thus the rate at which fluid is bled through conduit 80 from conduit 68 downstream of restriction 70. As servo orifice member 136 and valve 132 move relatively further apart, the effective area is increased bleeding more fluid from conduit 68 and thus lowering the pressure acting on diaphragm 56 and thus regulating engine fuel delivery. A hydraulic piston member of the differential area type is generally designated by numeral 138 and is slidably disposed in the second chamber 98 formed in housing 94. Piston 138 is comprised of a large diameter land 140 and a smaller diameter land 142 connected by rod 144 and are arranged to define three compartments 146, 148 and 150 within chamber 98 and in cooperation with housing 94. It is the purpose of a hydraulic piston member 138 to control the position of movable servo orifice member 136 to which it is connected by a first link 147 pinned to piston 138 at 149 and a second L-shaped link 151 pivotably secured to housing 94 by pivot 153 and pinned to first link 147 at 155. A foot portion 157 of second link 151 is inserted between bracket 159 formed on movable servo orifice 136 so that angular movement of link 151 will move orifice member 136 axially in response to movement of piston 138. Relatively low pressure $P_0$ fluid via return conduit 86 and chamber 96 is permitted to flow into compartment 150 wherein it provides a relatively small force acting upwardly on land 142 tending to move piston 138 upwardly. Relatively high regulated pressure, $P_R$, is supplied by conduit 64 to compartment 148 intermediate lands 140 and 142 providing a net force $[P_R \times (A_{140} - A_{142})]$ where A is the area of the respective lands designated by subscript acting upwardly on piston 138. Since in the preferred embodiment of our invention $P_0$ is relatively small and $P_R$ substantially constant, the net force described to this point acting to position piston 138 upwardly is substantially constant and will remain so regardless of movement of piston 138 within chamber 98. A conduit 152, including a restriction 154, is provided to supply control fluid from compartment 148 to compartment 146. Restriction 154 operates to limit the quantity of fluid supplied to compartment 146 such that by varying the quantity of fuel bled from conduit 152 downstream of restriction 154 the pressure in compartment 146 may be varied to any desired value within the limits of $P_R$ to $P_0$ and is designated $P_Z$ pressure fluid. Conduit 156 is connected to conduit 152, downstream of restriction 154 on one end and to a fixed servo orifice member 158 on the other. Servo orifice 158 is arranged in close proximity to servo valve member 134 so that said orifice and valve members define a variable effective flow permitting area capable of bleeding off varying quantities of fluid from conduit 156 and thereby vary the value of $P_Z$ pressure. An adjustable restriction 88 is provided in conduit 152 downstream of the connection of conduits 152 and 156 operates to limit the rate fluid can flow into compartment 146. $P_Z$ fluid pressure in compartment 146 acts downwardly on land 140 to provide a force tending to move piston 138 downwardly in opposition to the previously described substantially constant net force tending to move the piston upwardly. $P_Z$ fluid will have a pressure value therefor that will exactly balance out the upward forces which may be termed its "null" value. Any value of $P_Z$ pressure greater than "null" will cause said piston to move downwardly, any value less than "null" will permit the piston to move upwardly. The greater the deviation of $P_Z$ from its "null" value, the greater will be the force unbalance thereacross and therefore the faster piston 138 will move. Thus the velocity of movement is dependent on the degree of departure of $P_Z$ pressure from its "null" value. Adjustable bleed 88 by limiting the rate fluid can flow into or out of compartment 146 and therefore the rapidity that $P_Z$ pressure can be changed will operate as a velocity adjustment for piston 138. A second adjustable bleed 90 is provided in conduit 152 upstream of the connection between conduits 152 and 156 which is adjustable to provide either proportional or isochronous operation in a manner now described. When adjustable restriction 90 is wide open it has no effect on the system; when closed restriction 90 stops fluid flow through restriction 154 permitting $P_Z$ to equal $P_0$ pressure supplied by conduit 156. As a result piston 138 will move to its extreme upward position and remain there regardless of movement of valve 134 as long as adjustable restriction 90 remains closed.

FIGURE 3 shows some of the operating characteristics of our invention as illustrated by a plot of fuel flow ($W_f$) vs. speed (N). Curves 160 and 162 represent maximum and minimum fuel flow limits for acceleration and deceleration of the engine respectively as determined by the acceleration and deceleration control 74 of FIGURE 1. Curves 164, 166, 168 and 170 represent various governing curves to illustrate the operation of our invention. Curve 172 represents a steady state or equilibrium condition of operation where for a given engine load and ambient air conditions the curve represents the fuel required to maintain a stable speed, that is neither accelerating or decelerating. Curve 174 represents a second steady state curve which would be occasioned by a change in engine load or ambient air conditions. For consideration of the operation of our device the following conditions can be assumed to prevail: engine load and ambient air conditions are such that the steady state curve is the curve 172; the engine is running at a stable or equilibrium speed; governor settings are approximately as illustrated in FIGURE 2 with the exception of adjustable bleed 90 which is screwed into its "off" position whereby piston 138 maintains a constant position at the extreme upward location of its travel range. Under the assumed conditions of operation governor operating characteristics are represented by curve 168 and the fuel flow rate and engine speed is represented by the ordinate and abscissa respectively of point A defined by the intersection of curves 168 and 172. Further, under the assumed conditions of operation, the force moment acting on lever 112 due to flyweights 100 is balanced by the force moment produced by spring 120 so that lever 112 has a constant position and maintains $P_X$ pressure in conduit 68 and acting on diaphragm 56 at a value necessary to maintain the required fuel flow. If engine load is then increased or ambient air conditions change so that curve 174 represents a new steady state condition, the engine speed and flyweights 100 will begin to slow down since the fuel being supplied at point A is less than that required to maintain stable speed on curve 174. As the force from flyweights 100 acting on lever 112 drops, lever 112 will move clockwise bringing valve 132 closer to servo orifice member 136 and thus increase $P_X$ and also engine fuel flow. Speed will continue to drop and fuel flow to increase until the system stabilizes at the new equilibrium point B defined by the intersection of curves 168 and 174. It will be noted that throughout the range defined by curve 168 a speed shift is necessary to produce a fuel flow change. This relationship may be termed the proportionality or gain of the "droop" or proportional type governor represented by slope of curve 168. Generally the greater the proportionality the more stable will be control and engine operation, however, where precise regulation of speed is required such a system is deficient.

One of the features of our device is the provision of an easy, preferably external adjustment for varying the slope of the governor curve and thus control the degree of proportionality. By means of external adjustment 92, roller 128 may be positioned a certain degree to the right or left of the position illustrated in FIGURE 2 and thus increase or decrease the slope of the governing curve. By way of example, if roller 128 is adjusted to the right a certain distance from the illustrated position the moment arm of the force produced by spring 120 is increased. After such an adjustment the governor curve will be in accordance with curve 166 wherein the greater moment arm for the force from spring 120 will decrease the steepness of the governor curve. It is evident that a change from steady state curve 172 to 174 will cause a larger speed shift on governor curve 166 as represented by the distance between points A and C along the abscissa of FIGURE 3 than on curve 168 between the points A and B. Thus the degree of proportionality or slope of the governing curve may be adjusted by movement of roller 128.

If now adjustable bleed 90 is opened to permit movement of piston 138, governing operation will occur in accordance with curve 164 such that a change is steady state will not cause any speed shift and operation of the governor is termed "isochronous." Assume the steady state is curve 172 and equilibrium exist at the point A. The opposing forces of weights 100 and spring 120 are again balanced, $P_X$ is sufficient to maintain the required fuel flow represented by the ordinate of point A and $P_Z$ pressure is at its "null" value with piston 138 stationary. If steady state were then changed to curve 174 speed would drop since the fuel flow at point A is less than that required to maintain stable speed at the new equilibrium point D defined by the intersections of curves 164 and 174. As a result of a momentary speed decrease and a reduction in the force output of weights 100, lever 112 rotates clockwise initiating two simultaneous actions. First, servo valve 132 will move closer to orifice member 136 raising $P_X$ pressure and increasing fuel in the manner previously described as for example between points A and B. Secondly, servo valve 134 will advance closer to orifice 158 increasing $P_Z$ pressure above its null value so that piston 138 begins to move downwardly. Downward movement of piston 138 transmitted through mechanical connection 151 will position movable servo orifice member 136 further to the right, thus further reducing the effective flow permitting area defined by orifice 136 and valve 132 and further increasing $P_X$ pressure. Piston 138 will continue to move until $P_Z$ pressure again attains its null value which occurs at only one position of valve 134, thus lever 112 will return to its original position so that the point D has the same speed or abscissa as point A.

When it is desired to operate an engine at different speed from that indicated by the abscissa of points A or D, throttle lever 84 may be reset to provide a different force from spring 120. For example, to select a lower engine speed throttle 84 is moved clockwise allowing spring 120 to elongate and reduce the force on lever 112. Lever 112 will move counterclockwise reducing $P_X$ and $P_Z$ pressures which results in a decrease in engine fuel and a consequent decrease in engine speed. Speed will decrease until the force produced by flyweights 100 drops to the point where it balances the new lower spring force as for example at the point E on curve 170 of FIGure 3. The new regulated speed will then become that represented by the abscissa of point E.

Figure 4:
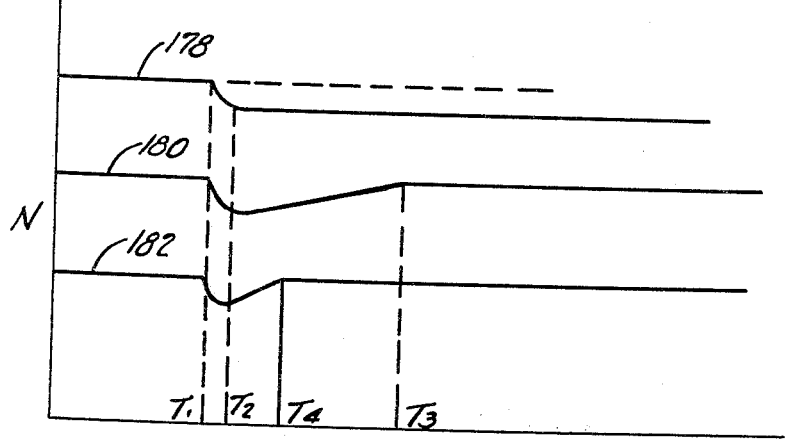
FIGURE 4 is a second curve illustrating some operating characteristics that may be brought out in a plot of speed vs. time.

FIGURE 4 is a graph showing further operating characteristics of our device as illustrated by a plot of engine speed (N) vs. time (T). Curve 178 represents this relationship for proportional operation as when adjustable bleed 90 is closed. If at the time $T_1$ the engine experiences a sudden increase in load, the control unit will provide a corrective increase in fuel during the elapse time $T_1$—$T_2$ and will restablize at time $T_2$. However, due to the previously mentioned speed shift, stabilization will occur at a slightly lower speed represented by the departure of curve 178 from the dash line at times greater than $T_2$. Curve 180 represents the speed vs. time relationship for isochronous action when adjustable bleed 90 is in the open position. It will be observed that a greater time is needed for stabilization, $T_1$—$T_3$, however, no speed shift will be experienced. The elapse time for stabilization may be varied by adjusting velocity control bleed 88. For example if bleed 88 is adjusted in a further open position so as not to restrict the flow of fluid between compartment 146 and passage 152, the speed vs. time relationship may be as illustrated by curve 182 where stabilzation occurs in the time $T_1$—$T_4$.

It should be understood that the adjustments and movements of the governor parts described above are of a reversible nature and movements in direction opposite to those described will induce similar functional changes in opposing directions. Further, the description is of a preferred embodiment of our device and it is contemplate that changes within the skill of the ordinary mechanic skilled in the art may be made without departing from the scope of the present invention.

We claim:

1. In a governor for controlling an engine fuel supply the combination of a movable fluid pressure responsive output member for controlling fuel delivery, conduit means for supplying a pressurized control fluid to said output member, a movable servo orifice member connected to said conduit means for varying the fluid pressure therein in response to the effective servo orifice area, a pivoted lever member having a first servo valve formed thereon, said first servo valve member being operative with said movable servo orifice to control the effective area thereof in response to movement of said pivoted lever member, a centrifugal flyweight adapted to be driven in relation to engine speed connected to said pivoted lever member to apply a speed generated force thereto tending to rotate said pivoted lever member in a first direction about its pivot, a throttle member, a spring contained between said throttle member and said pivoted lever member to apply a second force tending to rotate said lever member in a second direction about its pivot in proportion to throttle position, a differential area piston member connected to said movable servo orifice member to move said movable servo orifice member with respect to said first servo valve member and thereby vary the effective area thereof in response to movement of said differential area piston, said conduit means operative to supply pressurized control fluid to said differential area piston, said conduit means including a restriction therein arranged so that control fluid is supplied in limited quantities to one side of said differential area piston, a fixed servo orifice, passage means fluidly interconnecting said fixed servo orifice and the limited quantity of said control fluid acting on said one side of said differential area piston, and a second servo valve member formed on said pivoted lever and operative with said fixed servo orifice to control the effective area thereof in response to movement of said pivoted lever.

2. In a governor system for controlling fuel delivery to an engine, the combination of fuel control means for controlling the rate of fuel supplied to the engine in proportion to a variable fluid pressure, a pressurized control fluid source, first conduit means including a fixed restriction therein interconnecting said fuel control means and said pressurized control fluid source, a first servo orifice member fluidly connected to said first conduit means downstream of said restriction, governor means adapted to produce a force indicative of engine speed error, a pivoted lever connected to said governor means and movable in response to said speed error force, said pivoted lever further operative with said first servo orifice member to control the effective area thereof, a hydraulic piston member connected to said first servo orifice member to control the position of said first servo valve member and thereby further control the effective area thereof, second conduit means interconnecting said hydraulic piston and said pressurized control fluid source operative to supply a limited quantity of fluid to one side of said piston and an unlimited quantity of fluid to another side of said piston, a second servo orifice member having a fixed position, and a passage connecting said second servo orifice with the limited quantity of fluid on said one side of said piston member, said pivoted lever being operative with said second servo orifice member to control the effective area thereof.

3. In a governor system for controlling fuel delivery to an engine, the combination of pressure responsive means operative to control the fuel delivery rate in proportion to a variable fluid pressure input, first and second movable servo control members jointly operative to define a first effective area which is variable in response to relative movement of said first and second servo control members, control fluid supply means operative with said pressure responsive means and said first effective area to provide said fluid pressure input that is varied in direct relation to said first effective area, a pivoted lever connected to one of said first and second servo control members to control the position thereof and thereby vary said first effective area, a centrifugal flyweight member adapted to be driven in relation to engine speed connected to said lever to apply a first positioning force thereto, a throttle lever, a spring member connected to said throttle lever and said pivoted lever to apply a second positioning force to said lever in opposition to said first force and which is variable with throttle position, a piston member connected to the other of said first and second movable servo control members to vary said first effective area in response to movement thereof, means supplying a restricted quantity of pressurized control fluid to said piston member, a third fixed and a fourth movable servo control member jointly operative to define a second effective area which is variable in response to movement of said fourth movable servo control member, and passage means interconnecting said restricted quantity of control fluid acting on said piston and said second effective area, said fourth movable servo control member being connected to said pivoted lever for movement therewith.

4. In a governor, the combination of hydraulic servo means including a first movable servo valve and a movable servo orifice member jointly operative to control a fluid output pressure, governor flyweight and spring means connected to said first movable servo valve to control the position thereof and thereby vary said fluid output pressure, a differential area piston connected to said movable servo orifice member to control the position thereof and thereby vary said fluid output pressure, a regulated pressure control fluid source, first passage means transmitting regulated pressure control fluid from said source to one side of said differential area piston, second passage means including a restriction therein transmitting control fluid from said source to another side of said piston, a fixed servo orifice, third passage means fluidly connecting said fixed servo orifice and said second passage means downstream from said restriction, and a second movable servo valve jointly operative with said fixed servo orifice to control fluid pressure in said second passage downstream of said restriction, said second movable servo valve being connected and positioned by said governor flyweight and spring means.

5. In a governor as claimed in claim 4 including an adjustable restriction in said second passage means downstream of the connection between said second and third passage means to control the rate of movement of said piston member.

6. In a governor as claimed in claim 4 including an adjustable restriction in said second passage means upstream of the connection between said second and third passage means, said adjustable restriction adapted to be adjusted to a full off or no flow position to thereby inactivate said piston member.

7. In a governor as claimed in claim 4 wherein the connection between said flyweight and spring means and said first and second movable servo valves is a pivoted lever, said flyweight acting on one side of said lever tending to rotate said lever in a first direction, said spring means acting on another side of said lever tending to rotate said lever in a second direction, and an adjustable roller member interposed between said spring means and said lever to adjust the moment arm of the force produced by said spring means and thereby vary the effectiveness thereof.

8. In a governor, the combination of first and second movable control valve members, speed error responsive means operative to control the position of said first and second movable control valves, a movable servo orifice operative with said first movable control valve to define a first effective area, means responsive to said first effective area to control the rate of fuel delivery in response thereto, a fixed servo orifice member operative with said second movable control valve to define a second effective area, a piston member responsive to said second effective area, said piston member connected to said movable orifice member to control the position thereof.

9. In a governor as claimed in claim 8 wherein said fixed orifice member and said second movable control valve having a null value of said second effective area, said piston member movable in direction and at a rate corresponding to direction and degree of departure of said second effective area from said null value.

10. In a governor, the combination of hydraulic servo means including a movable servo valve member and a movable servo orifice member jointly operative to produce an output control signal that varies in proportion to the relative distance between said servo valve member and servo orifice member, speed means for generating an error signal responsive to the difference between actual and selected speed, first control means responsive to the error generated by said speed means for controlling the degree of movement of one of said movable servo members in proportion to said error, and second control means responsive to the error generated by said speed means for controlling the rate of movement of the other of said movable servo members.

References Cited in the file of this patent
UNITED STATES PATENTS

| | | |
|---|---|---|
| 2,743,735 | Dubois | May 1, 1956 |
| 2,982,258 | Farkas | May 2, 1961 |